W. P. SARGENT.
WRAPPING MACHINE.
APPLICATION FILED DEC. 22, 1909.

1,006,009.

Patented Oct. 17, 1911.

3 SHEETS—SHEET 1.

WITNESSES:

INVENTOR
William P. Sargent
BY
Augustus B Stoughton
ATTORNEY.

COLUMBIA PLANOGRAPH CO., WASHINGTON, D. C.

W. P. SARGENT.
WRAPPING MACHINE.
APPLICATION FILED DEC. 22, 1909.
1,006,009.
Patented Oct. 17, 1911.
3 SHEETS—SHEET 2.
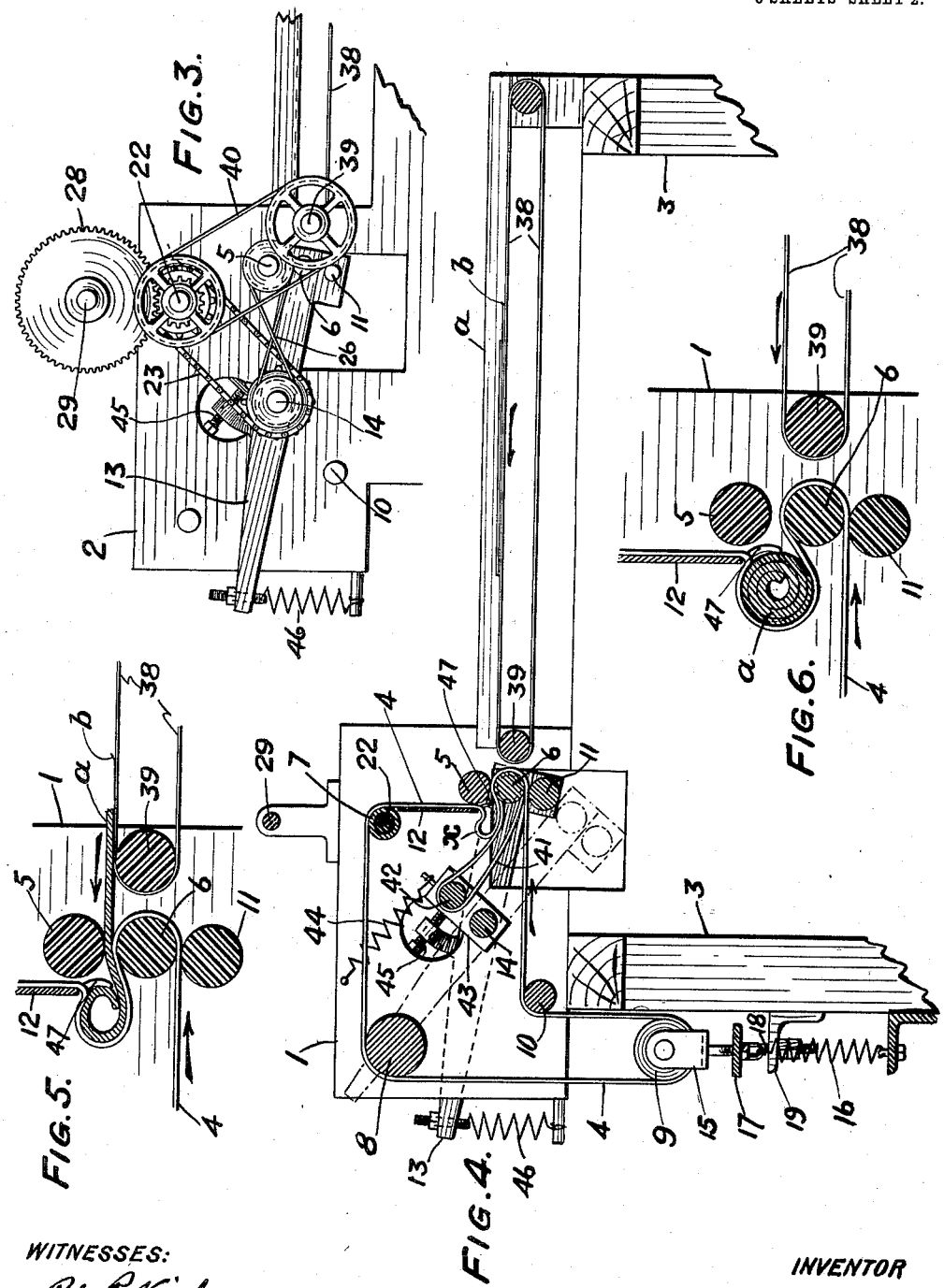
WITNESSES:
INVENTOR
William P. Sargent.
BY
Augustus B Stoughton
ATTORNEY.

W. P. SARGENT.
WRAPPING MACHINE.
APPLICATION FILED DEC. 22, 1909.

1,006,009.

Patented Oct. 17, 1911.

3 SHEETS—SHEET 3.

WITNESSES:

INVENTOR
William P. Sargent
BY
Augustus B. Stoughton.
ATTORNEY.

COLUMBIA PLANOGRAPH CO., WASHINGTON, D. C.

UNITED STATES PATENT OFFICE.

WILLIAM P. SARGENT, OF PHILADELPHIA, PENNSYLVANIA, ASSIGNOR TO THE CURTIS PUBLISHING COMPANY, OF PHILADELPHIA, PENNSYLVANIA, A CORPORATION OF PENNSYLVANIA.

WRAPPING-MACHINE.

1,006,009.              Specification of Letters Patent.       Patented Oct. 17, 1911.

Application filed December 22, 1909. Serial No. 534,410.

*To all whom it may concern:*

Be it known that I, WILLIAM P. SARGENT, a citizen of the United States, residing at Philadelphia, in the county of Philadelphia and State of Pennsylvania, have invented a certain new and useful Wrapping-Machine, of which the following is a specification.

Objects of the present invention are to provide a machine which will make high grade rolled packages more rapidly and better than can be made by hand, even by the most expert operators, and such as are required for distributing the very best publications to the readers in as good condition as they are when they leave the binder, even though the publications represent the highest degree of excellence in the typographical and illustrative arts; and to provide a machine by which savings are effected in respect to time and labor, to wrapping material, and to the bulk of the packages.

Other objects of the invention will appear from the following description of the invention which is made in connection with one, but not the only, embodiment of it chosen for illustration.

Figure 1:
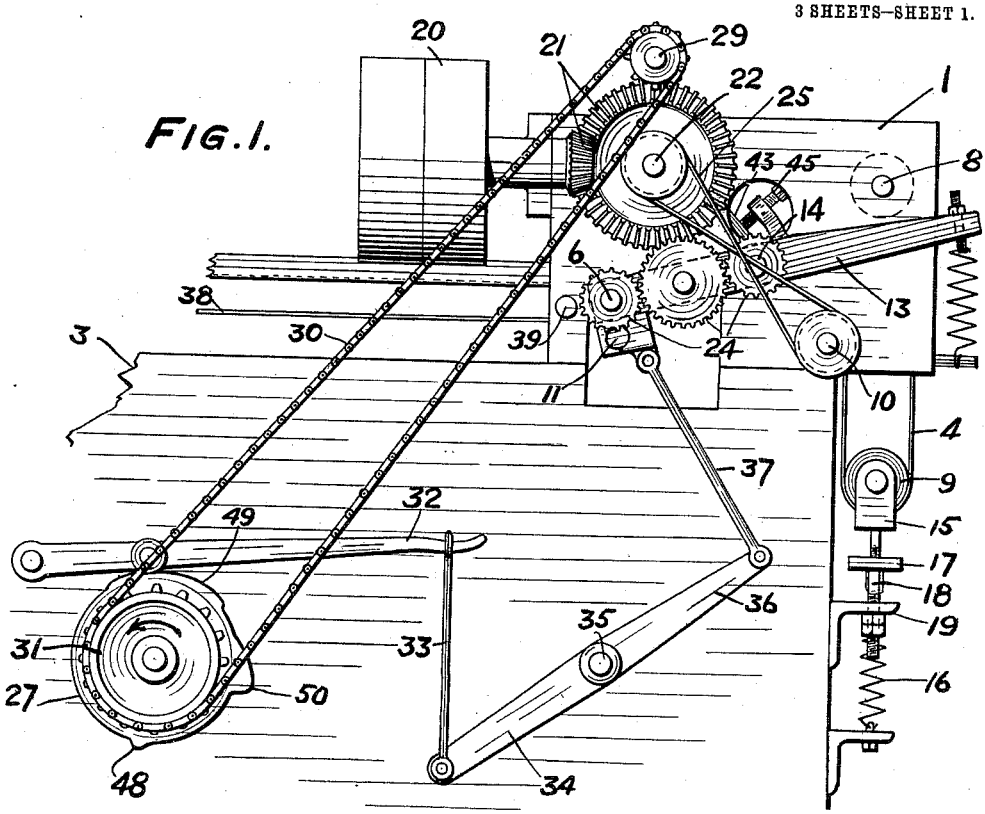
Figure 2:
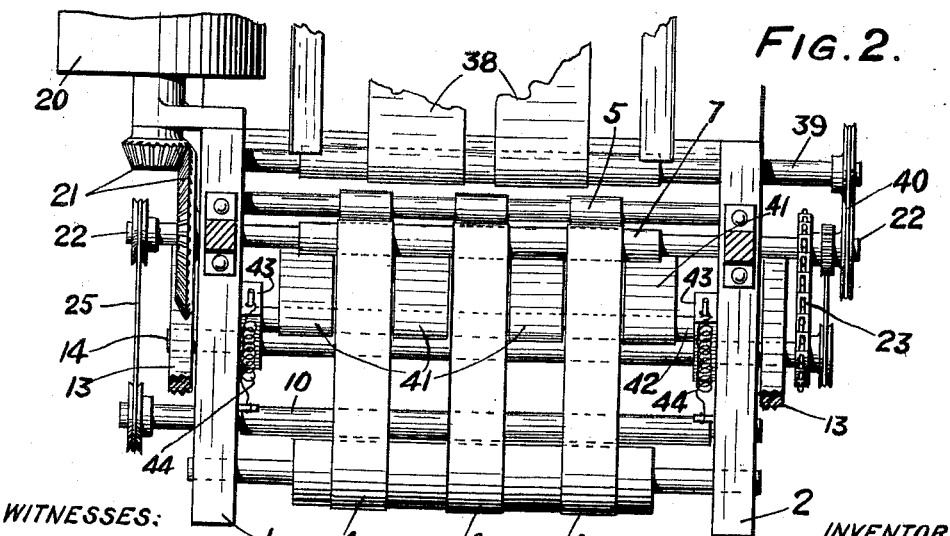

In the drawings, Figure 1, is a side view of the machine. Fig. 2, is a top or plan view of the parts shown at the right hand side of Fig. 1. Fig. 3, is a view of the side of the machine opposite to that shown in Fig. 1. Fig. 4, is a view principally in section of the machine, and Figs. 5, 6, 7, 8, 9, and 10, are views illustrating the operation of the machine.

In the drawings 1 and 2, are side frames which carry the various shafts and journals, which will be presently described, and which are shown as mounted upon legs or supports 3.

4, is a belt shown as of the endless variety and positively driven by means which will be described. In the drawings it is shown to consist of three parts, but I do not intend to limit myself to a belt made up of parts. The object of the belt is to roll a flexible publication and it should be commensurate in width with the length of the publication. There are means for driving the belt and for forming a running bight in the belt for receiving and spirally rolling a flexible publication. In the embodiment of the invention chosen for the sake of this description, and in the drawings, these means comprise a pair of feed rolls 5 and 6 around one, 6, of which the belt passes, an idle roll 7 shown as a freely revoluble sleeve, an idle roll 8, a belt tightener wheel 9, a driven roll 10, a pinch roll 11, and a guide 12, shown to consist of a bar. These parts, with the exception of the members 6, 11 and 9, are arranged between and suitably supported by the side frames 1 and 2. The rolls 6 and 11 are journaled in arms 13, pivoted on the shaft 14, or in other words, are mounted in a swinging frame. The belt tightener 15, of which the pulley 9 is a part, is adjustably connected with the springs 16. Inasmuch as there are several belt tighteners they are adjustably connected with a bar 17, to which two springs 16 are connected. The downward movement of the bar 17 is limited by adjustable stops 18 carried by brackets 19.

Power is applied to the machine as by means of the pulley 20, which by the beveled gearing 21, drives a shaft 22 arranged within the sleeve 7 and extending across the machine. At the other end of the shaft 22 there is a sprocket drive 23 (Fig. 3) to the shaft 14. At the other end of the shaft 14 (Fig. 1) there is a train of gears 24 carried by one of the arms 13 and connected with the feed roll 6. Referring to Fig. 1, the cross-belt 25 driven from the shaft 22, drives the roll 10. The running loop or bight produced by the described means is indicated at X. The stop 18 is obviously instrumental in forming this loop or bight. The loop is produced by a slackness in the belt and it may be said that it is empty in the sense that there is no mandrel, guide or equivalent found in it. The loop is maintained by directing the slackness to an appropriate position. The loop is on the slack side of the belt which is that part of the belt that has passed the driving roll 6. The driving roll 6 and an appropriate guide, of which 12 is an example, are means for maintaining and producing the loop.

Inasmuch as the feed roll 5 sometimes contacts with the belt, as will be hereinafter described, the means for driving it will now be described.

Referring to Fig. 3, the cross-belt 26 driven from the shaft 14 drives the roll 5. The belt tightener is a means for permitting of the enlargement of the running bight, to compensate for increase in the size of the spiral formed by the publications within the loop or bight X and to control the size of the rolled package. There are devices for opening the bight or loop X to permit of the removal of the wrapped publication and these devices will now be described. These devices include the provision of means by which the feed rolls 5 and 6 may be supported, and more specifically the swinging arms 13 and their operating mechanism.

27, is a cam driven from the shaft 22 (Fig. 1) by gearing 28 on one end of the shaft 29. At the other end of the shaft 29 (Fig. 1) there is a sprocket wheel which through a chain 30 drives a sprocket wheel 31 fast with the cam. The cam shown is of the edge variety and operates upon a pivotal arm 32, connected by means of a link 33 to an arm 34 of a rock shaft 35 having a pair of arms 36 arranged on each side of the machine and respectively connected by links 37 with the swinging arms 13. The cam 27, not only operates to open the loop, but also changes the relative positions of the feed rolls for purposes which will be hereinafter described.

38 is a conveyer belt arranged between the side frames of the machine and as shown its roller 39 is driven by the belt 40 from the shaft 22.

41 are lifting or deflecting belts and are arranged between the parts of the belt 4, and they pass around the roller 6 and around the roller 42 carried by arms 43 freely pivoted to the shaft 14 and acted upon by tension springs 44. 45 are adjustable back stops for these arms and these back stops are carried by the arms 13.

46 are adjustable tension springs connected with the arms 13 and with the frame of the machine. These springs 46 serve to adjust the pressure between the feed rolls 5 and 6.

47, are deflectors, shown as attached to the bar 12 and arranged intermediate of the parts of the belt 4, and they serve to positively deflect the advancing edge of the publication to start the formation of a spiral. The deflectors 47 are fixed and project into the loop X and are effective crosswise of the direction of the outgoing portion of the belt constituting the loop. In the construction shown in Fig. 7, the outgoing portion of the loop is to the right of the reference letter $x$ and the portion of the deflector that ranges or depends across this direction operates on the edge of the magazine to start the spiral roll as can be understood from Fig. 5.

Figure 7:
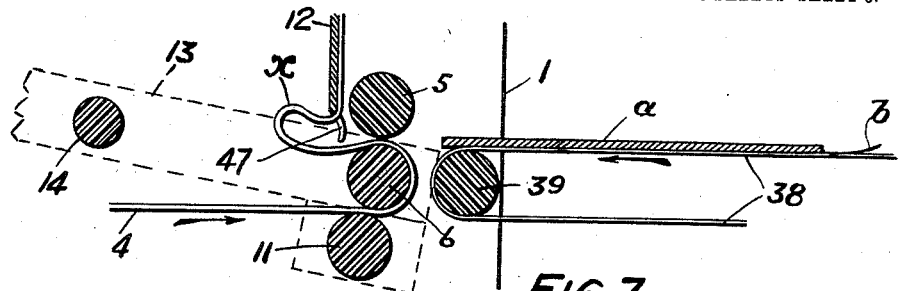
Figure 8:
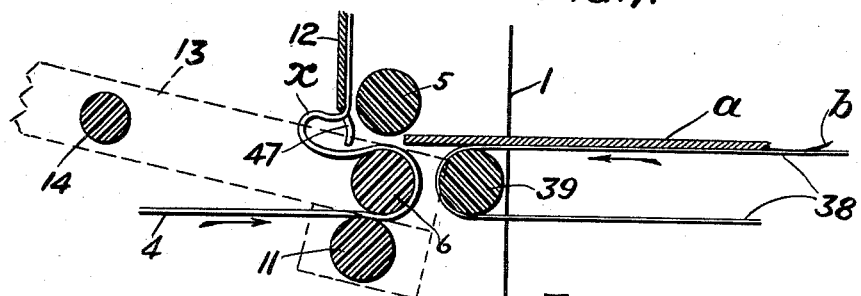
Figure 9:
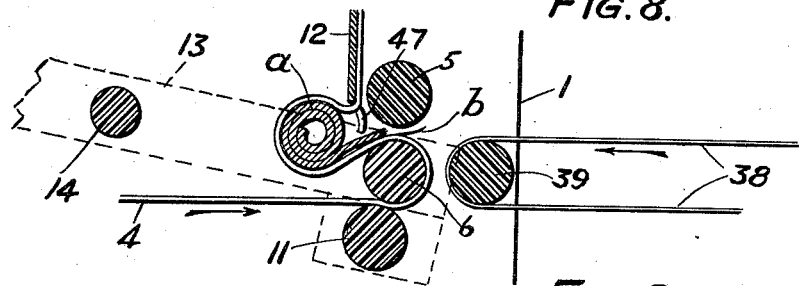
Figure 10:
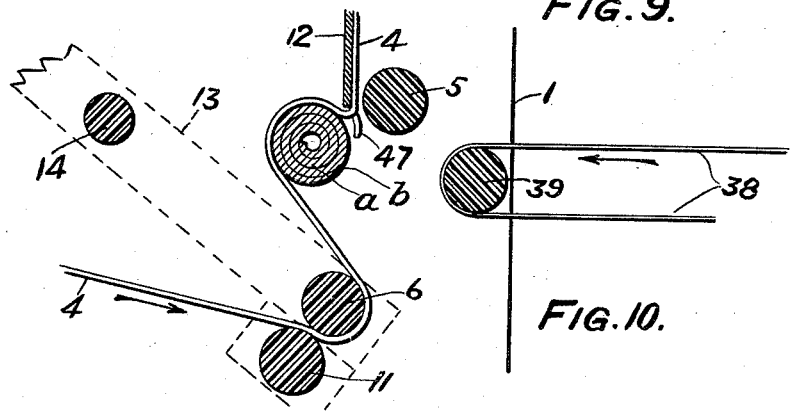

The operation of the machine in the production of a roll may be described as follows: Referring to Fig. 7, the flexible publication $a$, with the wrapper $b$, either following or partially underlying it, is fed on the conveyer 38. In this position the rolls 5 and 6 are in contact with the belt and pressed toward each other and the loop or bight X is formed and the swinging frame, which is made up of the arms 13, is in high position and consequently the cam roller of the arm 32 is on a low part of the cam. As shown in Fig. 8, the feed rollers are separated for the admission of the publication to the loop X. Under these circumstances the cam roller of the arm 32 is on a slight rise 48 of the cam. At the next step the roller on the arm 32 is free from the projection 48 and the feed rolls 5 and 6 bear upon the publication and feed it into the loop. This feeding continues until the origin of the spiral is formed. This is shown in Fig. 5 and it will be noted that the deflectors 47 play a part in forming the inner convolution of the spiral. The belts 41, when present, assist in this operation by lifting the advancing edge of the magazine into line with the loop X. Inasmuch as the sheets of the publication are bound along one edge, it follows that as the spiral is formed the sheets should be free to slide relatively to one another. For this purpose the feed rolls 5 and 6 are slightly separated. A slight rise 49 on the cam 27 actuates the arm 32 which in its turn properly positions the swinging frame for this purpose. The last described positioning of the feed rolls 5 and 6 in respect to each other not only accomplishes the purpose recited, but also permits the wrapper to enter the bight or loop X without wrinkling and also keeps the feed rolls clear of its pasted portion. This is indicated in Fig. 9. As soon as the feeding action of the rolls 5 and 6 is terminated, as has been described, the rolling action is performed entirely by the belt 4. As shown in Fig. 6, the publication remains in the loop or bight X sufficiently for fixing the paste or agglutinant. As shown in Fig. 10, the running loop or bight X is open freeing the wrapped publication for removal. The opening of the loop or bight is accomplished by the action of the part 50 of the cam, which shifts the swinging frame 13 to its lowest position. Evidently when the part 50 of the cam clears the arm 32 the swinging frame is returned to its initial position and the belt 4 contacting with the driven rolls 5 and 6 is caused to re-form into the loop or running bight X.

What I claim is:

1. A wrapping machine comprising a continuous belt, means for forming a flexible normally empty running loop in the belt for receiving and spirally rolling a flexible publication, said means arranged outside of the loop, provisions for permitting of the enlargement of the loop to compensate for increase in the size of the spiral formed by the publication, and movable devices operating upon some of said loop forming means for opening the loop to permit of the removal of the wrapped publication, substantially as described.

2. A wrapping machine comprising a belt, means for forming a flexible running loop in the belt for receiving and spirally rolling a flexible publication, means for positively deflecting the advancing edge of the publication to start the formation of a spiral, provisions for permitting of the enlargement of the loop to compensate for increase in the size of the spiral formed by the publication, and movable devices operating upon some of said loop forming means for opening the loop to permit of the removal of the wrapped publication, substantially as described.

3. In a wrapping machine the combination of a belt, means for forming a flexible running loop in the belt, and fixed deflecting devices projecting into the loop and across the direction of the line of travel of the outgoing portion of the belt constituting the loop.

4. In a wrapping machine the combination of a running loop for spirally rolling a flexible publication, means for feeding the publication to the loop and devices for periodically throwing the feeding means out of action to release the individual sheets of the publication and free them to slide in respect to each other and assume spiral form.

5. In a wrapping machine the combination of a running loop for spirally rolling a flexible publication and its wrapper, feeding means between which both the publication and the wrapper are delivered to the loop, and means for separating the feeding means to prevent the paste on the wrapper from contacting with the feeding means.

6. In a wrapping machine the combination of a series of parallel belts spaced apart, means for forming a running loop in said belts, and deflectors arranged between said belts and extending into said loop, substantially as described.

7. In a wrapping machine the combination of a series of parallel belts spaced apart, means for forming a running loop in said belts, and auxiliary belts spaced between the first mentioned belts, substantially as described.

8. In a wrapping machine the combination of a belt adapted to form a coreless loop, a guide and a belt driver arranged at the entrance of the loop, the latter acting on the ingoing portion and the former on the outgoing portion of the belt that forms the loop, and means for relatively shifting the guide and driver in respect to each other, whereby the loop is formed, opened and reformed.

9. In a wrapping machine the combination of a belt adapted to form a coreless loop, a guide and a belt driver arranged at the entrance of the loop, the latter acting on the ingoing portion and the former on the outgoing portion of the belt that forms the loop, and a deflector arranged on the same side of the loop as the guide and projecting into the loop, substantially as described.

10. In a wrapping machine the combination of an endless moving slack belt, and devices operating on the belt to constrain a portion thereof into the form of a running flexible coreless loop, and the whole of said devices arranged outside of the loop.

11. In a wrapping machine the combination of an endless moving slack belt, and devices operating on the belt to constrain a portion thereof into the form of a running flexible coreless loop, and all of said devices arranged outside of the loop, and means for governing the amount of slack in the belt, substantially as described.

In testimony whereof I have hereunto signed my name.

WILLIAM P. SARGENT.

Witnesses:
S. E. PATTERSON,
K. M. GILLIGAN.

---

Copies of this patent may be obtained for five cents each, by addressing the "Commissioner of Patents, Washington, D. C."